March 10, 1964 W. JUDA 3,124,520
ELECTROCHEMICAL CONVERSION OF ELECTROLYTE SOLUTIONS
Filed Sept. 28, 1959 2 Sheets-Sheet 1
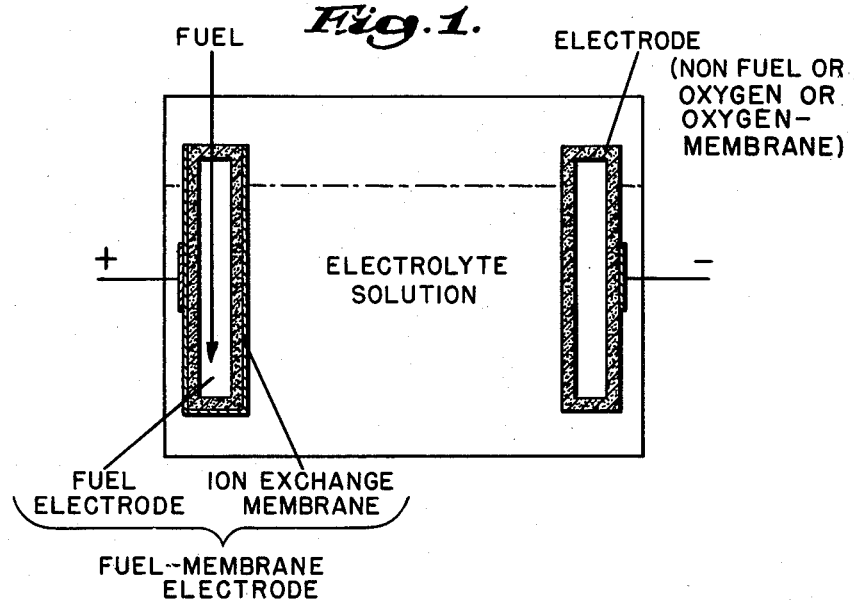
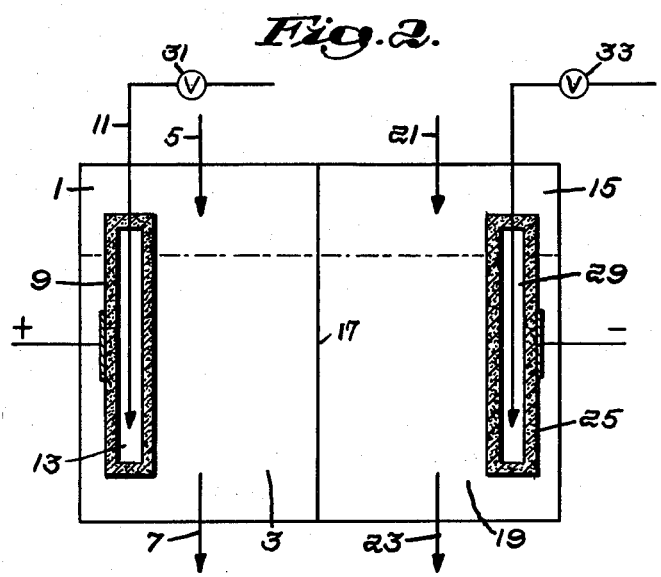
Inventor:
Walter Juda,
by
Attorney March 10, 1964  W. JUDA  3,124,520
ELECTROCHEMICAL CONVERSION OF ELECTROLYTE SOLUTIONS
Filed Sept. 28, 1959  2 Sheets-Sheet 2
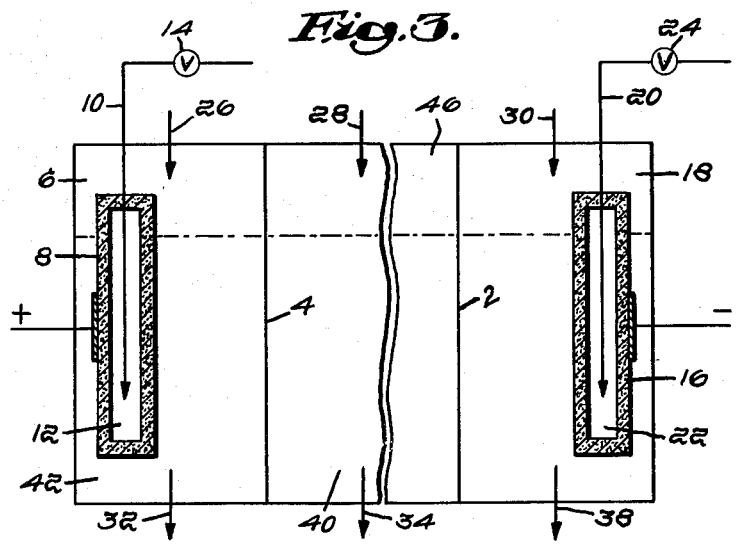
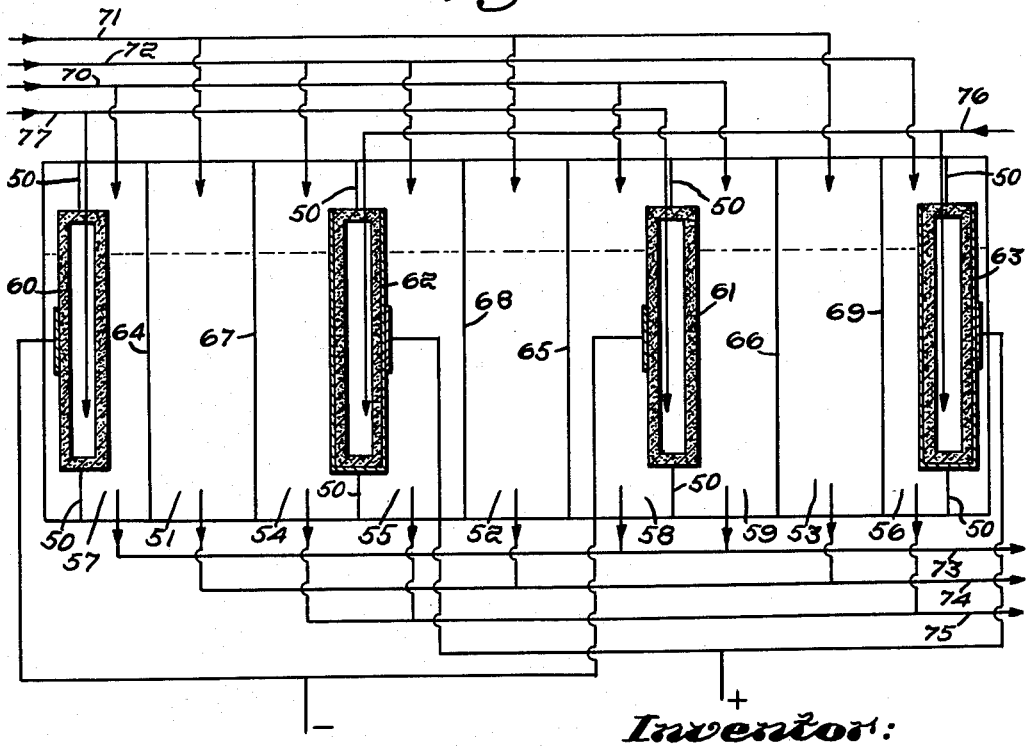
Inventor:
Walter Juda,
Aaron Tushin Attorney

United States Patent Office 3,124,520
Patented Mar. 10, 1964

3,124,520
ELECTROCHEMICAL CONVERSION OF ELECTROLYTE SOLUTIONS
Walter Juda, Lexington, Mass., assignor to Ionics, Incorporated, Cambridge, Mass., a corporation of Massachusetts
Filed Sept. 28, 1959, Ser. No. 842,892
12 Claims. (Cl. 204—86)

This invention relates to the electrochemical conversion, concentration, or dilution of electrolyte solutions by means of ion exchange membranes, and by D.C. energy saved at least in part by direct conversion of combustible gaseous or liquid fuels and/or oxidant gases or liquids. More particularly, the invention is concerned with electrolytic processes and the cells used therefor wherein the electrolytic cell is equipped with at least one ion exchange membrane, one electrolyte solution, and at least one porous fuel or oxidant-containing electrode. The processes of the present invention are also directed toward electrolytic procedures involving the selective migration of ions across an ion exchange membrane under the influence of a D.C. potential.

Electrolytic cells comprising ion exchange membranes are well-known and are especially adapted for electrochemical conversions in which it is important to isolate one electrolyte solution. Many typical applications of ion exchange membranes in electrolysis or electrodialysis cells are, for example, described in "Applications of Ion Exchange Membranes in Electrodialysis," by Mason and Juda, Chemical Engineering Progress, No. 24, vol. 55, pp. 155–162 (1959). The D.C. electric energy required for electrolysis and for electrodialysis is usually an important economic factor.

So-called "fuel cells" are well-known in which electrical energy (D.C.) is produced from the chemical energy of oxidant and combustible gases introduced through appropriate porous electrodes. In the typical fuel cell, hydrogen gas, or other combustible gas, is introduced into a cell through a porous electrode made, for example, of a noble metal, or of porous carbon containing a noble metal catalyst, or the like; and oxygen, or an oxygen containing gas, is introduced through a porous electrode containing preferably an active metal oxide catalyst, the two electrodes being electrolytically connected through either an aqueous electrolyte solution or a solid electrolyte, e.g. an ion exchange membrane. In these cells, low voltage D.C. energy is produced directly from the reaction of hydrogen and oxygen (or the like) including liquid fuels at conversion efficiencies considerably in excess of the usual conversion of chemical energy-to-heat-to-mechanical energy-to-electric energy.

Obviously, fuel cells as well as any other source of D.C. power can be used to supply the energy required for electrolytic conversion cells.

However, oxidant or combustible fuel electrodes, e.g. electrodes utilizing oxygen-containing gases or liquids or utilizing combustible gases or liquids, or both, have not heretofore been incorporated within electrochemical conversion cells comprising ion exchange membranes.

It is an object of the present invention to provide a process involving the use of ion exchange membranes in combination with combustible and/or oxidant fuel electrodes. It is a further object of the invention to provide means for electrolyzing or electrodialyzing solutions, wherein a cell is employed containing at least one ion exchange membrane and at least one combustible or oxidant fuel electrode, thereby providing means to eliminate the energy required to discharge at least one gas at one electrode.

In general, the process and equipment of this invention utilizes at least one ion exchange membrane defining at least one solution compartment and at least one combustible or oxidant fuel electrode within the same cell.

In one cell construction, according to this invention, a combustible or oxidant catalytic porous electrode is placed in face-to-face physical and electrical contact with an ion exchange membrane (containing water in sufficient quantity, for example in excess of 15%, to render the same electrolytically conducting). For convenience, combustible or oxidant catalytic porous electrodes are hereinafter generically referred to as "fuel electrodes." This combination fuel electrode-ion exchange membrane is called herein "fuel-membrane electrode." In a "fuel-membrane electrode," the membrane is a solid electrolyte which, among other functions, protects the very fine pores of the fuel electrode against capillary adsorption of solution. Such adsorption interferes or prevents the fuel from interacting with the electrode. An electrolytic solution to be modified electrochemically is then contacted with at least one such fuel-membrane electrode in an electrolytic cell or in an electrodialysis cell. Alternately, a fuel electrode is contacted with an electrolyte solution which is separated from another electrolyte solution by an ion exchange membrane, the system "fuel electrode/electrolyte solution/ion exchange membrane/electrolyte solution" being incorporated in an electrolysis or electrodialysis cell including another electrode which can be either a conventional electrode or another porous electrode.

Substantial savings in energy consumption of the electrolytic or electrodialytic process are secured when a fuel electrode, and especially a gas electrode, is integrated with the cells in which a chemical conversion, concentration, or dilution takes place. In such a cell, the necessity of supplying energy for the discharge of a gaseous product at the gas electrode is eliminated. Furthermore, by choosing a gas electrode with an appropriate catalyst, the conversion of the gas to an aqueous ion can be accelerated sufficiently so that the gaseous reaction minimizes the D.C. energy required under reasonable currents. Finally, comparing a conversion cell comprising fuel electrodes with a conventional conversion cell powered by a separate fuel cell, a significant energy saving is obtained in the former because the ohmic loss of the separate fuel cell is eliminated.

The saving in total energy consumption obtained by eliminating the energy required to discharge gaseous products at the electrodes is especially significant where the voltage drops across the electrolyte solution and membrane (or membranes) is relatively small. Gaseous discharge potentials, including overvoltages, often account for 75% or more of the total potential when electrolytic conversion cells are operated at relatively high current densities, typically exceeding 10 amperes per square foot, as is the case, for example, in single compartment cells and in two compartment single membrane cells, with electrolyte solutions of relatively high concentrations. The percentage of the total energy expanded at the electrode decreases as the current density decreases and/or as the number of ion exchange membranes and solution compartments included in the cell increases. Thus, in multi-membrane cells, the saving in D.C. energy by the elimination of gaseous electrode products is relatively less important than the production of electric energy in situ by means of appropriate fuel electrodes.

Simple porous electrodes such as for example porous graphite can be used in some cases to avoid the discharge of gases. In general, however, it is preferable that the fuel electrode is a porous conductor which is capable of absorbing either the combustible gas or liquid or the oxygen-containing gas or oxidant liquid and which at the same time comprises a suitable catalyst for the electrode reaction.

For hydrogen containing combustible gases, e.g., for the electrode reaction:

(1) $$H_2 = 2H^+ + 2e$$

suitable catalysts include metals of group VIII of the periodic table such as rhodium, platinum, palladium, and irridium. Other catalysts may constitute the electrodes themselves or they may be deposited on porous conducting structures including graphite, porous nickel and the like. Other combustile gases, including carbon monoxide and hydrocarbons, especially methane, in place of or in addition to hydrogen, can be used. Liquid combustible fuels, e.g., liquid hydrocarbons, methane, ethanol or the like may also be used.

Oxygen-containing gases also require porous conducting electrodes in which it is especially important to provide a suitable catalyst. Porous conductors without catalytic activity, such as porous carbon (e.g. graphite) can be used to convert oxygen to hydroxyl ion according to the reaction (2) $$\tfrac{1}{2}O_2 + H_2O + 2e = 2OH^-$$

but their effectiveness is often inadequate. Reaction (2) is rendered efficient, by the incorporation of an appropriate catalyst into the porous structure, especially at reasonably high current densities exceeding 10 amperes per square foot. Porous carbon without catalyst is suitable for use in applications where relatively low current densities are desired. It can also be adequate, for example, for the suppression of hydrogen evolution at a cathode. Preferably, however, the oxygen electrode, e.g., the gas electrode at which an oxygen containing gas is converted to the hydroxyl ion, comprises a conducting porous structure activated with a metal oxide of catalytic activity for reaction (2), such electrodes including the oxides of silver, gold, iron, magnesium, cobalt, copper and others. In many cases the oxygen (or cathode porous) electrode may contain the metal capable of forming catalytically-active oxides, and the oxide may be formed in situ by a preoxidation treatment.

Reference is also made to the many gas electrodes described in the literature as part of fuel cells, including, for example, U.S. Patent No. 2,913,511, U.S. Patent 2,860,175 and U.S. Patent 2,384,463 and German Patent 904,200 (1954), many of which are suitable for use according to the present invention.

The use of fuel electrodes in electrolytic processes is of special value when the electrolytic process is carried out in such a manner that energy requirement consists of relatively low D.C. voltage input and a relatively high current density. Evidently, their application is further enhanced when the source of hydrogen-containing and/or oxygen-containing gas is readily avilable at low cost.

Combustible fuels include hydrogen and hydrocarbons such as methane, ethane, coal gas, etc., and also carbon monoxide and the like with the fuel anode. Oxidants include oxygen, air, halogens (gaseous or liquid), etc.

The efficiency of conversion of chemical to D.C. electric energy at a fuel electrode is highly dependent upon the nature of the electrolyte in contact with the fuel electrodes. For example, oxygen electrodes are especially efficient when the electrolyte is a caustic solution as the conversion proceeds from oxygen gas to hydroxyl ion. The reversible voltage of the reaction of oxygen gas to hydroxyl ion (reaction 2 above) in alkali is of the order of .1 to .2 of a volt, whereas in acid 1 volt is produced. Further, if an alkaline electrolyte contains significant quantities of other ions, the efficiency of the energy production can be seriously impaired. For example, if an oxygen electrode containing a silver oxide catalyst is utilized in a mixed electrolyte of sodium hydroxide and sodium chloride, the voltage (at reasonable current densities, e.g. exceeding 10 amps/sq. ft.) is considerably less than that produced in a pure sodium hydroxide electrolyte, due to silver chloride formation. Oxygen electrodes tend to operate best in strong alkaline electrolytes containing a minimum of harmful contaminating anions.

One important advantage of utilizing ion exchange membranes in electrolytic cells comprising fuel electrodes is the flexibility given to the system by the membranes in that they permit the choice of the electrolyte most suited for the particular fuel electrode. For example, an appropriate cation exchange membrane makes it possible to use a pure caustic solution in the compartment containing the oxygen electrode thereby obtaining the maximum potential from the oxygen/hydroxyl ion reaction; and to subject other electrolytes in the other compartments to electrolysis or electrodialysis without contamination of either the electrode or the solution to be converted.

Ion exchange membranes, both cation selective and anion selective, suitable for use according to this invention, have been described in the literature. Reference is made, for example, to U.S. Patent Re. 24,865 which describes a variety of membranes and a variety of processes for their preparation. In general, the membranes are solid polymeric cross-linked electrolytes containing significant amounts of hydration water or gel water, preferably in excess of 15% of the weight of the dry resin in order to insure sufficient conductivity of the membrane.

The first category of cells and processes of this invention utilizes a fuel-membrane electrode, preferably a gas fuel membrane electrode, and a conventional electrode, the prime electrochemical product/or products being produced at the conventional electrode. Many electrochemical processes of commercial significance using conventional chemical conversion cells waste electric energy at one electrode. For example, in the electro-winning of metals from their sulfate solutions, including electro-winning of copper, zinc, nickel, cobalt, etc., oxygen is usually produced at an anode. The anode voltage which includes the oxygen discharge voltage as well as the oxygen overvoltage often represents a large fraction of the total electric energy required in the cell. The anode voltage can be between ⅓ and ⅔ of the total cell voltage, depending upon the case. According to one embodiment of this invention, a gas membrane electrode is used as the anode and is supplied with hydrogen gas. In this manner, D.C. voltage requirements are lowered (rather than consumed in the discharge of oxygen). The membrane in contact with the hydrogen electrode protects the electrode against capillary sorption of the electrolyte solution (which causes loss of contact of hydrogen gas) and against ionic impurities.

If undesirable ions including, for example, nitrate ion in the case of an anion membrane, or oxidizable cations such as ferrous iron in the case of a cation membrane, are present in the electrolyte and affect the proper functioning of the fuel electrode, then a second category of cells and processes of this invention is advantageous, namely a two-compartment cell comprising (1) a conventional electrode at which the prime product or products of the process are produced, (2) the electrolyte solution from which the prime product or products are obtained by electrolysis, (3) an ion exchange membrane separating this electrolyte from (4) a second electrolyte adapted for use in conjunction with a fuel (preferably gas) electrode and (5) a fuel, preferably a gas electrode in contact with the second electrolyte. Here it is important that the porous gas electrode be protected against the capillary sorption of the electrolyte by means of a treatment which renders the gas electrode repellent to the electrolyte solution without closing the pores. Such treatments are known to include, for example, the coating of the gas electrode with a thin film of paraffin or rubber or the like, without impeding gas flow through the electrode.

This second mode of operation is typically advantageous in applications where the electrolyte used as source of an electrochemical product contains many impurities harmful to fuel electrodes. For example, if copper is to be plated from a sulfuric acid solution containing ferrous impurities it is best to separate the impure electrolyte from a pure sulfuric acid solution by means of a cation exchange membrane utilizing a hydrogen electrode as the anode, thereby continuously making hydrogen ion at the anode, transferring hydrogen ion through the membrane and maintaining the ferrous iron in the catholyte where it will not be oxidized.

For many applications, either the apparatus and mode of operation of category 1 or that of category 2 can be used to advantage.

An important example is the use of an oxygen electrode in caustic-chlorine cells. The use of oxygen or air as a depolarizer by means of porous graphite cathodes in diaphragm cells has been described previously. This method was ineffective in making a significant contribution not only because of the absence of an appropriate oxygen-to-hydroxyl ion catalyst in the graphite, but also because of the character of the mixed electrolyte, NaOH-NaCl, obtained as catholyte in the diaphragm cell. The usual oxide catalysts operate best, that is, give the highest voltage contribution according to reaction (2) in a pure caustic solution, as pointed out above. Therefore, the use of graphite or, preferably, of a porous conducting oxygen or air electrode containing a catalyst is much more efficiently carried out in a caustic-chloride cell which comprises a suitable cation exchange membrane to separate the anolyte from the catholyte. In this way, substantially chloride-free caustic is produced at the cathode as is well-known from U.S. Patent Re. 24,865 and U.S. Patent No. 3,017,338, issued January 16, 1962. So long as the hydrogen normally produced at the usual steel cathode is not salable, but merely lost to the atmosphere, it is very advantageous to utilize an oxygen electrode such as described above, and supply said electrode with either oxygen or air, thereby gaining about 1 volt out of 4 even at the commercially high current densities exceeding 100 amps/sq. ft. A porous oxygen membrane electrode, that is, an electrode having a porous oxygen conductor and a cation membrane in face-to-face contact can also be used in the membrane cell for caustic and chlorine.

A third category of cells and processes relates to the electrochemical production of electrolytes in solution in which otherwise two undesirable gaseous electrode by-products are made. Typical of such applications are the regeneration of spent pickle liquor for steel; and the electrochemical conversion of sodium sulfate solution to sodium hydroxide and sulfuric acid of interest, for example, to the rayon industry.

Spent pickle liquor from steel contains sulfuric acid and ferrous sulfate. Its disposal constitutes a major pollution problem. An economical process which removes part or all of the iron and thereby renders the sulfuric acid content effective again for pickling steel would solve a major pollution problem. Electrolytic cells with ion exchange membranes can accomplish this purpose. One kind of such a cell utilizes a cation membrane separating the anode compartment from the cathode compartment. As anodes, lead or antimony-lead is a suitable material, whereas steel is a suitable cathode. Here the pickle liquor is fed to the anode, and the ferrous ion as well as hydrogen ion are transferred to the cathode compartment where the iron can be cathodically precipitated as iron oxide or even deposited as metallic iron. The latter is undesirable because the build-up of iron is difficult to remove from the cell. Alternately, an anion membrane may be used instead of the cation membrane and the pickle liquor may be fed to the cathode compartment. Regeneration of the pickle liquor consists then in the formation of iron-free sulfuric acid at the anode. In both cases, oxygen is evolved at the anode and hydrogen at the cathode. These two gases are not desired and the D.C. energy required for their release constitutes the major portion of the energy for this recovery process of spent pickle liquor. Here the use of a gas electrode, in particular a hydrogen electrode as the anode, constitutes a major saving in that the hydrogen-oxygen reaction in sulfuric acid can save from 2 to 3 volts of the total of 3 to 5 volts ordinarily required for the electrolysis of pickle liquor. The hydrogen may either be supplied separately to a porous hydrogen anode and additional energy can be saved by supplying oxygen or air to an oxygen electrode used as the cathode, or, if no inexpensive source of hydrogen is available, the hydrogen evolved at a conventional steel cathode can be fed to porous hydrogen anode, thereby restituting the major portion of the energy wasted in the release of the hydrogen. In this manner, electric energy is primarily supplied only for the selective transfer of the ions through the cation or anion membrane respectively and an important portion of energy previously wasted at the electrode is now saved.

If low-cost hydrogen or other combustible gas is available at a steel mill, it may be advantageous to use it and at the same time prevent evolution of hydrogen at the cathode by means of an oxygen or air electrode. Here it is more efficient to utilize a second membrane in the cell permitting the use of a pure caustic catholyte in conjunction with the oxygen electrode (see above). For example, such a cell would comprise an "oxygen" or "air" cathode, a caustic catholyte, a first anion membrane, a "center" compartment containing pickle liquor, a second anion membrane, an anolyte of pure sulfuric acid and a hydrogen anode. Hydroxyl ion is produced at the cathode from oxygen and water, transferred through the first anion membrane into the pickle liquor, increasing its pH, sulfate ion is transferred from the center compartment to the anolyte forming sulfuric acid by action of hydrogen gas to hydrogen ion. The sulfuric acid anolyte is reused. Iron oxide is precipitated from the center compartment.

Similar cells may be used to convert sodium sulfate in solution to caustic and either to sulfuric acid or to sodium acid sulfate. Again, hydrogen is evolved at the cathode and oxygen at the anode. One way of operating such cells is to evolve hydrogen at a conventional cathode, such as are made of steel or Hastelloy, and to feed this hydrogen to a hydrogen electrode used as the anode, thereby preventing the evolution of oxygen and regaining electric energy by reaction of hydrogen gas to hydrogen ion. If a source of combustible gas, hydrogen and/or other gas, is economically available, then the use of an oxygen or air electrode as the cathode is advantageous. In the latter event, the energy produced from, for example, hydrogen and oxygen (or air) with two gas electrodes may be sufficient for the electrolytic decomposition of sodium sulfate to sodium hydroxide and sulfuric acid, at reasonable current densities in an appropriate low cell resistance, that is a cell dissipating less ohmic energy than corresponds to the difference between about 55 kilocalories per mol of water produced from $H_2 + \frac{1}{2}O_2$ minus about 13 kilocalories per mol required to produce sulfuric acid and sodium hydroxide from sodium sulfate.

In general, little D.C. electric energy is required in reactions in which both types of gaseous electrodes are used, providing that the energy required for the electrochemical conversion is less than that obtainable from the combined gas electrodes.

In order to better illustrate the invention of the present case, reference is made to the drawings wherein:

FIGURE 1 is a diagrammatic representation of a conversion cell adapted for chemical conversion of electrolytes having one compartment therein and having at least one fuel-membrane electrode.

FIGURE 2 is a diagrammatic representation of a conversion cell having two compartments, separated by an ion exchange membrane and at least one electrode may be operated as a fuel, preferably gas, electrode.

FIGURE 3 is a diagrammatic illustration of a cell with at least three compartments defined by spaced ion exchange membranes therein having at least one electrode as a fuel, preferably gas, electrode.

FIGURE 4 represents diagrammatically a variation and construction of the cells described in this invention and consists essentially of a series of two or more cells having one or more common electrodes wherein two anode compartments served by opposite faces of the same anode alternate with two cathode compartments served by opposite faces of the same cathode.

Variations of these figures utilizing fuel or gas membrane electrodes in place of fuel-electrode can be made in accordance with the principles described above and need not be drawn here in detail.

Further, in any of the cells described containing a fuel or gas electrode a suitable gas membrane electrode may sometimes be substituted to advantage in accordance with the principles described above.

The invention may be better understood by reference to the following description taken in connection with the drawings which are diagrammatic illustrations of the membrane-fuel cells within the scope of the present invention.

The cell of FIGURE 1 is an ordinary electrolysis cell in which at least one fuel or gas membrane electrode is used in lieu of a conventional electrode to reduce part of the energy requirements. The elements of this cell are self explanatory from the drawing.

The cell of FIGURE 2 comprises an anode compartment 1 containing the electrolyte solution 3 which is introduced into the compartment through inlet 5 and is withdrawn by means of outlet 7, and anode 9 which is composed of a porous conductor capable of activating a combustible fuel, e.g., hydrogen gas, the anode functioning as an agent for absorbing and releasing into the electrolyte solution in an electro-chemically active form the combustible fuel, e.g., a hydrogen-containing gas which enters the electrode by means of inlet pipe 11 which extends into well 13 of the anode, said well being confined to the central portion of the anode. The cathode compartment 15 is separated from the anode compartment by ion-exchange membrane 17 and contains an electrolytic solution 19 which enters the compartment through inlet 21 and leaves through outlet 23 and a cathode 25 which is composed of a porous conductor capable of activating an oxidant fuel, e.g., oxygen gas, the cathode functioning to absorb and release into the catholyte 19 in an electromechically active form the oxidant, e.g., an oxygen-containing gas which enters the cathode by means of inlet 27. Inlet 27 extends into well 29 of the electrode, said well being confined to the central portion of said electrode. Valves 31 and 33 located in inlets 11 and 27, respectively, serve to regulate the flow of combustible and oxidant gases, e.g. of hydrogen - containing and oxygen-containing gases, respectively, or to allow the use of but one fuel electrode when desired.

The operation of the cell of FIGURE 2, wherein the separating ion-exchange membrane is cation selected in character, may be illustrated as follows:

An aqueous solution of the electrolyte, for example, sodium chloride, is introduced into the anode compartment 1 through inlet 5 and either water or a dilute aqueous solution of an alkali metal hydroxide is passed into the cathode compartment 15 through inlet 21. A hydrogen-containing gas in conducted into the anolyte sodium chloride 3, via the porous anode 9, an oxygen-containing gas is conducted into the catholyte 19 via the porous cathode 25 and a minimal amount of electric current (which source is not shown) is impressed upon the cell through electrodes 25 and 9. Hydrogen ions formed at the anode by the interaction of hydrogen gas with the sodium chloride solution in conjunction with the chloride ions of the electrolyte forms the corresponding acid, i.e. hydrchloric acid, which is withdrawn through exit 7. The cation Na+ is attracted toward the cathode 25 and passes through the cation selective membrane 17, which allows its passage but repels the anionic chloride ions, into the cathode compartment 15 where it combines with hydroxyl ions formed by the interaction of oxygen with the catholyte 19 to form the corresponding metal hydroxide, i.e. sodium hydroxide, which is withdrawn through exit 23.

The electrolytic cell of FIGURE 2 may be operated with one anion-exchange membrane, in which instance, the electrolyte feed solution is for example, introduced into the cathode compartment, the anionic group migrating to the anode to form the corresponding acid. These general procedures may also be run employing one gas-containing electrode and one electrode of conventional design and function. It is apparent that in operations where the anode used is a conventional one, the anode compartment product would, in the case of a sodium chloride feed solution, be chlorine gas, and in operations utilizing a conventional cathode, the cathode compartment product would be, for example, hydrogen gas and/or a metal such as Cu, Zn, Cd, etc.

It is evident that this procedure can be employed in the conversion of salts into their corresponding acids and bases. It may also be advantageously applied to the purification of bases where the impurity is of an anionic nature, such as chlorine ions, or to the purification of acids where the impurity is of a cationic nature, such as sodium ions. The mechanisms of these alternative applications will correspond to those underlying the interactions involving salts.

Among the further variations possible in the construction or application of the electrolytic cell employed in the general procedure are, for example:

(1) A cell with a gas fed cathode and the anode is of conventional design and function; (2) a cell with a gas fed anode and the cathode is of conventional design and function; (3) a three compartment cell wherein the electrolyte feed solution is electrochemically modified in the center compartment between two ion exchange membranes; (4) a series of cell compartments with common electrodes wherein two anode compartments served by opposite faces of the same anode, alternate with two cathode compartments served by opposite faces of the same cathode, the end compartments being an exception to such alternation.

In FIGURE 3 a three or more compartment electrolytic cell is defined by spaced permselective membranes 2 and 4, anode chamber 6 containing the porous anode electrode 8, having gas inlet 10, extending into well 12 of said electrode and said inlet having regulating valve 14 therein. The porous cathode electrode 16 is located in cathode chamber 18 with inlet 20 extending into well 22 of said electrode. The inlet 20 has a regulating valve 24 therein. All three chambers are provided with inlets 26, 28, and 30, and outlets 32, 34, 38, respectively for the flow of electrolytic solutions. The center compartment is designated at 46.

The operation of the cell of FIGURE 3 may be illustrated with respect to a process involving two or more ion-exchange membranes selectively permeable toward anions. Accordingly, an aqueous solution of the electrolyte, for example, sodium sulfate is introduced into the center compartment through inlet 28 while simultaneously there is introduced into the anode compartment 6 water at a rate determined by the final concentration of the anode product desired. Into the cathode compartment 18 water or a dilute aqueous solution of an alkali metal hydroxide is passed. A hydrogen-containing gas, for example methane, is passed into the anolyte 42 through inlet 10 and porous anode 8 and an oxygen-containing gas, for example air, is passed into the catholyte 44 through inlet 20 and porous cathode 16, while a minimal D.C. voltage is impressed upon the cell. Ion-exchange membrane 4 permits the passage of the anionic group of the electrolyte feed in the center compartment, i.e. sulfate ions, toward the anode 8 where combination with hydrogen ions formed by the interaction of hydrogen gas with the anolyte produces the corresponding acid, i.e. sulfuric acid. The depletion of the original electrolyte solution 40 in feed center chamber 46 of its anionic groups, for example, sulfate ions, is compensated for by the concurrent flow of hydroxyl ions from the cathode compartment through membrane 2 into the center compartment 46 where combination with the cation, sodium ions, produces the corresponding sodium hydroxide. The effluent from the cathode compartment is the dilute alkali metal hydroxide solution which has been regenerated by the production of hydroxyl ions through an interaction at the cathode of oxygen with the catholyte.

The processes of the above procedure can also be applied to cases where the original electrolyte is an impure acid whose impurities are of a cationic nature, such as sodium ions, the purified acid being withdrawn from the anode compartment; and to cases where the original electrolyte is an impure base whose impurities are of an anionic nature, such as chloride ions, a purified base being withdrawn from the center compartment.

The type of cell illustrated in FIGURE 3 may be set up in series, wherein two anode compartments served by opposite faces of the same anode alternate with two cathode compartments served by opposite faces of the same cathode, which involves two or more alternating anion and cation permselective membranes.

In order to understand the operations of a third procedure, reference is made to FIGURE 3 where membrane 4 is an ion-exchange membrane selectively permeable to anions and membrane 2 is an ion-exchange membrane selectively permeable to cations. In this case, an aqueous solution of the electrolyte, for example, sodium chloride solution, is introduced into the center compartment through inlet 28, the center compartment product being withdrawn through outlet 34. Simultaneously with the introduction of the sodium chloride solution, water is introduced into the anode and cathode compartments through inlets 26 and 30, respectively, or the water streams may be replaced by a dilute inorganic acid stream flowing into the anode compartment and a dilute alkali metal hydroxide solution into the cathode compartment. A combustible liquid or gaseous fuel, e.g., a hydrogen-containing gas is passed into the anolyte via the porous anode, a liquid or gaseous oxidant, e.g., an oxygen-containing gas is passed into the catholyte via the porous cathode. If required, a minimal amount of additional D.C. voltage from a conventional power supply is impressed upon the cell. The cations, sodium ions, are attracted toward the cathode 16 and pass through the cation permselective membrane 2 into the cathode compartment 18 where they unite with hydroxyl ions formed from the interaction of oxygen with the electrolyte therein to produce the corresponding hydroxide, sodium hydroxide. The anions, chloride ions, are attracted toward the anode 8 and pass through the anion permselective membrane 4 into the anode compartment 6 where they combine with hydrogen ions formed from the interaction of hydrogen gas with the electrolyte therein to produce the corresponding acid, hydrochloric acid. The anolyte and catholyte effluents may be recycled to their respective cell compartments.

The cells of FIGURE 4 have center compartments designated by 51, 52, 53; anode compartments 54, 55, 56 and cathode compartments 57, 58 and 59. The fuel-membrane cathode electrodes are designated by 60 and 61 and are of the type previously described, and similarly constructed 62 and 63 are the anodes similar in design and function to those of FIGURES 1 and 2. Nos. 64, 65 and 66 are cation permselective membranes and 67, 68 and 69, anion permselective membranes. Each compartment is equipped with an inlet and outlet for passage of electrolyte solutions. The inlet manifold for the cathode compartment is designated by 70, that for the center compartments by 71 and that for the anode compartments by 72. The outlet manifolds are designated as: catholyte 73, center 74 and anolyte 75. The hydrogen-containing gas inlet manifold is 76 and the oxygen-containing gas inlet manifold is 77. The electrode compartments are defined by hydraulic and electric insulators 50 (such as plastics, etc.) which also function to support said electrodes in the compartments of the cell.

These cells may, however, contain only one ion-exchange membrane per cell, in which case there are only two cell compartments per cell. The membrane employed may be selectively permeable to either cations or anions.

The center compartment effluent consisting of an electrolytic solution is substantially depleted of both its cationic and anionic constituents and is hence a relatively highly purified water product; therefore, this general procedure herein described serves as an efficient and economical means for purifying water of inorganic impurities and may be applicable, for example, in the purification of brackish water and seat water. Inversely, by reversing the position of the cation and anion membranes (or of the two electrodes) and feeding, for example, salt, to the end compartments, the center solution may be concentrated which is, for example, of interest in the production of salt from sea water. In the case of commercial application of this general procedure toward either desalting or the concentration of salt-containing water, the cell is preferably equipped with a series of ion-exchange membranes, alternating between those selectively permeable to cations and those selectively permeable to anions and numbering preferably from about ten to twenty such pairs, thus separating the electrolytic cell into a series of compartments. In this particular system, the solution to be demineralized is passed as the influent into alternating compartments, including the compartments containing the anode and cathode, the other compartments serving to contain the flow of electrolyte-enriched (concentrated) water, that is, the concentrated streams alternate with the demineralized water streams. In this manner, a relatively large volume of water can be demineralized and/or concentrated at low power consumption and at a relatively high rate.

This type of cell may be operated with only one gas-containing electrode or it may be set up in series having common electrodes as was described for the first and second general procedures.

When porous cathodes and anodes are used in such concentration-dilution cells, it is important to limit the number of cells intervening between the fuel or gas electrodes so that the internal resistance is low enough to permit a reasonable current to pass therethrough. For example, in the case of diluting and concentrating sea water in cells with membranes between 0.1 and 0.7 mm. thick and spaced between ½ and 2 mm. apart, the number of cell pairs between fuel or gas electrodes should preferably not exceed about twenty.

To demonstrate the energy advantage to be gained from the use of fuel electrodes in appropriate electrolytes at practical current densities, the following series of experiments were carried out:

A simple electrolytic cell was constructed with two graphite electrodes of approximately 20 cm.$^2$ electrode area. The aqueous electrolyte solution used in this cell was (a) 20% KOH, (b) 20% NaOH, (c) 20% HCl. These solutions were electrolyzed by impressing a D.C. voltage across the two electrodes, utilizing a conventional D.C. power supply. The voltages corresponding to current density of 10 and 100 milliamperes/cm.$^2$ were measured at a temperature of 30° C. and 60° C. The measured values are "control" values referred to in Table I under the heading "Conventional Electrolysis."

In one series of fuel electrode measurements, the electrolysis was repeated after one of the conventional graphite electrodes, namely the cathode, was replaced with an oxygen fuel cathode of the same surface area (apparent). A porous carbon electrode comprising a silver oxide catalyst is suitable. Oxygen gas was supplied to the fuel electrode in amount adequate to insure a slight excess of oxygen. Table I shows the voltage reduction obtained when an oxygen fuel electrode is used in 20% KOH, 20% NaOH and 20% HCl, respectively, at current densities of 10 and 100 milliamperes/cm.$^2$.

Table I also shows that the oxygen cathode is most effective in KOH, almost as good in NaOH with a significantly smaller benefit in HCl.

In another series of experiments the same cell was used with a conventional graphite cathode but with a hydrogen anode. Again sufficient hydrogen gas was supplied to insure an excess of hydrogen. A porous graphite anode with a platinum catalyst is suitable. Table II shows the results obtained employing a hydrogen anode, in potassium hydroxide and in sulfuric acid.

It is seen that the hydrogen anode is quite effective in both acids and base, but clearly better in acid.

In still another series of experiments, the electrolysis was repeated inserting in the cell a cation exchange membrane of the sulfonic type utilizing as catholyte a 5% solution of NaOH and as anolyte a 20% solution of NaCl in order to compare the operation of this cell with a conventional steel cathode and an oxygen cathode. Table III shows the comparative advantages of power savings (reduction in required voltage) in the use of the oxygen cathode over that of conventional electrolysis (non-fuel electrodes).

TABLE I
*Oxygen Cathodes in Base and Acid*

| Temp., °C. | Current Density, ma./cm.$^2$ | Electrolyte | Conventional Electrolysis, Volts | Oxygen Cathode, Volts |
|---|---|---|---|---|
| 30 | 10 | 20% KOH | 1.95 | 0.6 |
| 30 | 100 | 20% KOH | 2.4 | 1.2 |
| 60 | 10 | 20% KOH | 1.8 | 0.5 |
| 60 | 100 | 20% KOH | 2.2 | 0.9 |
| 30 | 10 | 20% NaOH | 1.95 | 0.8 |
| 30 | 100 | 20% NaOH | 2.55 | 1.1 |
| 60 | 10 | 20% NaOH | 1.8 | 0.6 |
| 60 | 100 | 20% NaOH | 2.2 | 1.2 |
| 30 | 10 | 20% HCl | 1.7 | 1.4 |
| 30 | 100 | 20% HCl | 2.1 | 2.0 |
| 60 | 10 | 20% HCl | 1.6 | 1.3 |
| 60 | 100 | 20% HCl | 2.0 | 1.7 |

TABLE II
*Hydrogen Anode in Base and Acid*

| Temp., °C. | Current Density, ma./cm.$^2$ | Electrolyte | Conventional Electrolysis, Volts | Hydrogen Anode, Volts |
|---|---|---|---|---|
| 30 | 10 | 20% KOH | 1.95 | 0.6 |
| 30 | 100 | 20% KOH | 2.4 | 1.5 |
| 60 | 10 | 20% KOH | 1.8 | 0.4 |
| 60 | 100 | 20% KOH | 2.2 | 1.2 |
| 30 | 10 | H$_2$SO$_4$ 1.225 sp. g. | 2.2 | 0.8 |
| 30 | 100 | H$_2$SO$_4$ 1.225 sp. g. | 2.9 | 1.4 |
| 60 | 10 | H$_2$SO$_4$ 1.225 sp. g. | 1.8 | 0.5 |
| 60 | 100 | H$_2$SO$_4$ 1.225 sp. g. | 2.6 | 1.1 |

TABLE III
*Oxygen Cathode in Caustic-Chlorine Cell*

| Temp., °C. | Current Density, ma./cm.$^2$ | Electrolyte Anolyte | Electrolyte Catholyte | Conventional Electrolysis, Volts | Oxygen Cathode, Volts |
|---|---|---|---|---|---|
| 30 | 10 | 20% NaCl | 5% NaOH | 2.6 | 1.45 |
| 30 | 100 | 20% NaCl | 5% NaOH | 3.7 | 2.75 |
| 60 | 10 | 20% NaCl | 5% NaOH | 2.0 | 0.9 |
| 60 | 100 | 20% NaCl | 5% NaOH | 3.3 | 2.2 |

In general when a fuel membrane electrode is used in place of a conventional electrode, the same effect is observed as above except that the internal resistance per unit thickness of electrolyte between the electrodes is usually higher for the membrane electrolyte than it is for concentrated electrolytes in solution. The high internal resistance signifies a higher voltage requirement corresponding to a given current density.

In addition, the use of fuel membrane electrodes and/or fuel electrodes in conjunction with membrane-defined chambers in a chemical conversion cell effects the improvements set forth hereinbefore, e.g., flexibility in selecting the electrolyte most suited for the particular electrode and subjecting other electrolytes in the other compartments of the cell to electrolysis or electrodialysis without contamination of either the electrode or the solution to be converted; the membrane in contact with the electrode protects the same against capillary sorption of the electrolyte solution and against ionic impurities; separates the streams or electrolytes which are necessary for chemical conversion; increases the efficiency of the product production of the fuel cell, etc.

The following examples are illustrative of the practice of the invention and are not for purpose of limitation:

EXAMPLE 1

An electrolytic cell of the design represented by FIGURE 2 is constructed containing two graphite electrodes of approximately 20 cm.$^2$ area each, as flat plates, and the cation exchange membrane, for example, of the styrene sulfonic acid type, is as described in U.S. Patent 2,731,411. The anode compartment of this cell is filled with an aqueous solution of sodium chloride (20%) and the cathode compartment is filled with a 5% aqueous solution of sodium hydroxide. D.C. current is then passed through this cell by applying to it a D.C. voltage from a conventional power supply. The voltages corresponding to 10 and 100 milliamps/cm.$^2$ at 30° C. and 60° C. are recorded in Table III as "controls." The conventional graphite cathode is then replaced with an oxygen electrode such as the one referred to above and used in 5% NaOH. Current densities of ten to 100 milliamps/cm.$^2$ are passed and the corresponding voltages are recorded in Table III.

It is clearly seen from the data of Table III above that caustic and chlorine are produced in this cell at a considerable saving in voltage, and consequently, power, when using oxygen cathode.

EXAMPLE 2

An electrolytic cell of the design represented by FIGURE 2 is constructed containing an ion-exchange membrane selectively permeable to cations, a porous graphite anode of rectangular shape having a thickness of 1.0 inch, a porosity of 75% and an air permeability of 60 cubic inches/sq. inch/minute/atmosphere and which had previously been coated with a thin coating of paraffin in order to render it water-repellent, and a porous water-repellent graphite cathode of rectangular shape having a thickness of 2.0 inch, a porosity of 75% and an air permeability of 70 cubic inches/sq. inch/minute/atmosphere. The walls of the cell are of Plexiglas. The membrane is composed of a copolymer of divinyl benzene and acrylic acid, and has a water content of 25%, an ion exchange capacity of 5.2 milliequivalents per dry gram and a specific resistivity of 25 ohm centimeters. The area of each electrode and membrane is 30 square centimeters.

A 5.3 N aqueous solution of sodium chloride having a temperature of about 90° C. is conducted into the anode compartment at a rate adjusted so that the corresponding effluent outflow is 1.5 ml. per minute. Water is conducted into the cathode compartment at a rate so that the effluent outflow therein is 0.28 ml. per minute. A current density of 100 milliamps/cm.$^2$ is maintained at the cathode by passing a direct electric current of 3 amperes and 1.5 volts through the cell. A stream of 70% pure oxygen is passed into the porous cathode at a rate sufficient to supply a slight excess at atmospheric pressure, and a stream of 90% pure hydrogen is passed into the anode at a rate sufficient to supply a slight excess at atmospheric pressure. The anolyte effluent consists of 1.1 N hydrochloric and 4.2 N sodium chloride. The catholyte effluent consists of 5.9 N sodium hydroxide.

The flow of gases into the electrodes was discontinued to simulate conventional electrodes. The voltage required now is 4.3 volts, representing a savings of 2.8 volts by the use of gas electrodes and a corresponding saving in power consumption.

EXAMPLE 3

The procedure for example 2 is repeated, however, no hydrogen is admitted to the anode. The anode compartment product in this case is chlorine gas which analyzes to a purity of 98.9% after drying and liquefying. The savings in voltage and power realized in Example 1 are repeated here.

EXAMPLE 4

An electrolytic cell of the design represented by FIGURE 3 is constructed containing two ion-exchange membranes selectively permeable to anions and two gas-activating electrodes described in Example 2. The membranes are composed of a copolymer of styrene and divinyl benzene and contain 45% by weight of water which copolymer has been chloromethylated and treated with trimethylamine (U.S. Patent No. 2,780,604) have anion exchange capacity of 2.4 milliequivalents per dry gram and a specific resistivity of 20 ohm centimeters. Each electrode and membrane have an area equal to 40 cm.$^2$.

An aqueous solution having a temperature of about 60° C. and consisting of 1.0 N sulfuric acid and 1.45 N ferrous sulfate is conducted into the center compartment at a rate adjusted so that the corresponding effluent flows out at a rate of 1.9 ml. per minute. The anode compartment is fed with water at about 60° C. so that the rate of flow of effluent is 1.9 cc. per minute. The cathode compartment is fed with an aqueous solution of 1.0 N NaOH at a temperature of about 60° C. which is recirculated at a rate of 50 ml. per minute. A current density of 100 amperes per sq. foot is maintained at the cathode by passing a direct electric current of 4.0 amperes and 1.4 volts through the cell. A stream of 96% pure oxygen is passed into the cathode at a rate sufficient to supply a slight excess at atmospheric pressure and a stream of 90% pure hydrogen is passed into the anode at a rate sufficient to supply a slight excess at atmospheric pressure. The anolyte effluent consists of 1.0 N sulfuric acid and the center compartment effluent consists of 1.45 N ferrous sulfate.

The flow of gases into the electrodes was discontinued. The voltage required now is 4.6. The use of gas-containing electrodes represents a savings of 3.2 volts over a similar process utilizing conventional electrodes and consequently represents a corresponding savings in power consumption.

EXAMPLE 5

An electrolytic cell of the design represented by FIGURE 3 is constructed containing one ion-exchange membrane selectively permeable to cations and another selectively permeable to anion. The cation permselective membrane is similar to that used in Example 1, the anion permselective membrane similar to those used in Example 4.

A 5.3 N aqueous solution of sodium chloride is conducted into the center compartment and recirculated through this compartment at a rate of 10 ml. per minute. The anode compartment is fed with water so that the effluent outflow is 0.64 ml. per minute. The cathode compartment is fed with water so that the effluent outflow is 0.64 ml. per minute. The temperature of the effluents are approximately 60° C.

A current density of 100 amperes per square foot is maintained at the cathode by passing a direct electric current of 3 amperes and 1.8 volts through the cell. A stream of 96% pure oxygen is passed into the cathode at an adequate rate at atmospheric pressure and a stream of 90% pure hydrogen is passed into the anode at an adequate rate at atmospheric pressure. The anolyte effluent consists of 3 hydrochloric acid and the catholyte effluent consists of 3 N sodium hydroxide.

The flow of gases into the electrodes was discontinued. The voltage required now is 4.8. The use of gas-containing electrodes therefore represents a savings of 3.0 volts over a similar process utilizing conventional electrodes and consequently represents a corresponding savings in power consumption.

EXAMPLE 6

An electrolytic cell of the design represented by FIGURE 4 is constructed containing three cation permselective membranes similar to that used in Example 1 and three anion permselective membranes similar to those used in Example 4. The cell has two porous hydrogen-activating anodes and two porous oxygen activating cathodes similar to those used in Example 5. The construction of the cell is such that there are three cell pairs wherein the order of electrodes and membranes are as follows: cathode—cation membrane—anion membrane—anode—anion membrane—cation membrane—cathode—cation membrane—anion membrane—anode.

The cell is now operated in a manner similar to that employed in Example 5 using similar solutions, similar effluent rates and similar electrical constants. The effluent solutions have similar concentrations. The total current density is 93 amperes per square foot and the voltage is 1.8 volts.

The flow of gases into the electrodes was discontinued. The voltage required now is 4.8 volts, representing a savings of 3.0 volts and a corresponding savings in power consumption when gas electrodes were employed.

EXAMPLE 7

An electrolytic cell assembly consisting of the cells of the general design represented by FIGURE 3, is constructed containing ten ion-exchange membranes selectively permeable to cations and ion-exchange membranes selectively permeable to anions in alternating order. The cell, as set up, contains 19 center compartments and two end compartments. The latter are functionally equivalent to the center compartments, since the electrodes in these end compartments are bounded by membranes. Ten of the center compartments in alternating order serve as concentrating chambers and 9 of the center compartments and the two end compartments, serve as diluting or feed chambers.

Into the feed chambers is introduced at a rate of about 18 ml. per minute and at a temperature of about 50° C. a 0.6 N aqueous sodium chloride solution. Into the concentrating chambers is introduced water at the same rate and temperature.

A current density of 45 milliamperes/cm.$^2$ is maintained at the cathode by passing a direct electric current of 1.3 amperes and 1.2 volts through the cell. A stream of 96% pure oxygen is passed into the cathode at atmospheric pressure and a stream of 90% pure hydrogen is passed into the anode at atmospheric pressure, both gases at rates slightly in excess of the rate of H$_2$O formation.

The total flow per cell assembly is 38 ml. per minute; the total concentrating chamber effluent flow is 23 ml. per minute and consists of a 0.8 N sodium chloride solution; the total diluting chamber effluent flow is 15 ml. per minute and consists of a 0.3 N sodium chloride solution.

The flow of gases into the electrodes was discontinued. The voltage required now is 5.5 volts representing a savings of 4.3 volts and a corresponding savings in power consumption when employing gas electrodes.

EXAMPLE 8

An electrolytic cell of the design represented by FIGURE 1 is constructed containing a hydrogen-cation exchange membrane anode, a solution of electrolyte containing 250 g. per liter of chromium-trioxide, CrO$_3$, and 2½ g./liter of sulfuric acid. The cathode consists of a piece of iron to be chromium plated. A current density of 50–75 milliamps/cm.² is passed through this cell at a voltage of between 2½ and 3 volts instead of the usual 5–6 volts which were required when ordinary lead anodes were used in place of the hydrogen membrane electrode. In this example the cation membrane prevents the access of chromic acid to the anode thereby avoiding the undesirable reduction of the chromic acid.

Having now described typical examples of cell operation according to this invention, it will suffice to list more significant examples of industrial applications wherein this principle can be utilized.

EXAMPLE 9

An electrolytic cell of the design of Example 5 is constructed having three compartments formed by two electrodes and one cation selective membrane and one anion selective membrane, the cation membrane being a carboxylic type near the cathode, and the anion membrane being a weekly basic high capacity type near the anode.

A 3.2 N solution of sodium sulfate is fed to the center compartment and recirculated at 8 ml. per minute. The anode compartment is fed with water or 4.8 sodium sulfate at a rate such that the effluent outflow is 0.71 ml. per minute. The cathode compartment is fed with water so that the effluent outflow is 0.71 ml./min. The temperature of the effluents is about 40° C.

A current density of 200 milliamps per square cm. is maintained at the cathode by passing a direct current of 6 amperes at 2.1 volts through the cell. A stream of 90% pure oxygen is passed into the cathode at an adequate rate at atmospheric pressure, and a stream of water gas (approximately 45% methane and 45% $H_2$) is passed into the anode at an adequate rate at atmospheric pressure. The anolyte consists of 4.8 N $H_2SO_4$ or 4.8 N $NaHSO_4$ and the catholyte effluent consists of 2.4 N sodium hydroxide.

The flow of gases to the electrodes is stopped and the voltage now required to pass current at the same current density is 4.8 volts.

EXAMPLE 10

An electrolytic cell of the design of FIGURE 1 is constructed containing a hydrogen-cation exchange membrane anode, a copper cathode, an electrolyte solution consisting of leach liquor from low grade copper ores with about 36 grams per liter of copper (as copper sulfate) and 40 grams per liter of sulfuric acid. A current density of 10 milliamps per square cm. is maintained at the cathode by impressing a voltage of about 0.5 volt across the cell. Ninety percent pure hydrogen is passed into the anode at an adequate rate. Greater than 99 percent pure copper is deposited at the cathode. When the hydrogen gas flow into the anode is stopped, the potential across the cell has to be increased to about 2.1 volts to maintain the current density thus illustrating the savings in power gained through use of this invention.

The advantages gained in power saving in the electrowinning of copper also apply to a corresponding degree in the electrowinning of Ni, Cr, Cd, Pb, Zn, Ag, Sn, Mn, Sb, Co and Fe, as will be apparent from the following three further examples directed to chromium, cobalt, and cadmium.

EXAMPLE 11

An electrolytic cell of the design of FIGURE 1 is constructed containing a hydrogen-cation fuel membrane anode, and an aluminum bronze cathode for the electrowinning of chromium. The electrolyte is prepared from ammonium chrome alum from the sulfuric acid leach of low grade chromium ores and contains approximately 90 grams per liter chromium and 30 grams per liter ammonia. Hydrogen gas is passed into the anode and a current density of 70 milliamps per square cm. is maintained at the cathode with a cell potential of 3.1 volts at an operating temperature of 46° C. When an inert conventional anode electrode such as lead was used in place of the fuel cation membrane anode the cell potential had to be increased to 4.3 volts, thus illustrating the savings in power.

EXAMPLE 12

A cell of the design of FIGURE 1 is constructed with a hydrogen fuel cation membrane anode and a stainless steel cathode for the electrowinning of cobalt. The electrolyte consists of a solution of 20 grams per liter cobalt as cobalt sulfate, 50 grams per liter boric acid, and 5 grams per liter sodium fluoride. The cell is maintained at 60° C. Hydrogen is passed into the anode and a current density of 25 milliamps per square cm. is applied to the cathode at 1.2 volts. Greater than 99 percent pure cobalt is deposited at the cathode. Where the cell was operating with an inert or conventional anode such as lead, increased power was required as shown by the operating cell voltage of 2.8 volts.

EXAMPLE 13

In order to demonstrate the electrowinning of cadmium, a cell is constructed of the design of the previous example with an aluminum cathode. When hydrogen is passed into the anode and the cell is operated at a current density of 10 milliamps per square cm. at 1.5 volts, cadmium is deposited as the cathode from an electrolyte containing 180 grams per liter cadmium and 75 grams per liter sulfuric acid. On operating the cell with an inert anode, such as lead, the voltage necessary was increased to 2.8 volts.

EXAMPLE 14

An electrolytic cell corresponding to FIGURE 1 is constructed with a cation membrane anode and a cathode consisting of a mold of a piece to be electroformed. The electrolyte consists of $CuSO_4$, 255 grams per liter, and sulfuric acid, 75 grams per liter. A current density of 200 milliamps per square cm. is maintained at the mold cathode at 1.1 volts. Methane gas is introduced into the anode. A conventional electroforming cell operating at this current density requires a voltage of 2.5 volts thus illustrating the power savings of this invention.

EXAMPLE 15

A cell of the design of FIGURE 1 is constructed with a hydrogen cation membrane anode, an iron cathode to be electrogalvanized and an electrolyte of 200 grams of Zn per liter and 250 grams of $H_2SO_4$ per liter. The current density at the cathode is 1 amp per square cm. and the voltage across the cell is 2.5 volts. 90 percent pure hydrogen is passed into the anode at an adequate rate. Hydrogen gas liberated at the cathode is collected and recirculated to the anode to supply part of the fuel. In the absence of the fuel membrane anode 4 volts is required to maintain the current density thus demonstrating the savings accomplished by the process of this invention.

EXAMPLE 16

A cell of the design of FIGURE 2 is constructed with porous gas electrodes at both anode and cathode with a cation membrane separating anolyte and catholyte. Spent pickle liquor consisting of 1 N $H_2SO_4$ and 2 N $FeSO_4$ is fed into the anode compartment and 1 N NaOH is recirculated in the cathode compartment. A current density of 100 milliamperes per square cm. is maintained at the electrode by passing a current of 3.0 amperes at 1 volt through the cell. 70 percent pure oxygen is passed into the cathode and 90 percent pure hydrogen into the anode at an adequate rate. The anolyte effluent outflow is 1.2 ml. per minute at a composition of 2.5 N $H_2SO_4$ and 0.5 N $FeSO_4$. In the regeneration of spent pickle liquor without fuel electrodes, the voltage drop across the cell is 3.5 volts thus illustrating the saving in voltage and consequently of power in the process.

EXAMPLE 17

The electrolytic cell of the previous example is replaced with an inert cathode and the cell is otherwise operated in the same manner with spent pickle liquor. Hydrogen gas evolved at the cathode in the electrolysis is circulated to the porous hydrogen anode thus supplying part of the hydrogen requirement. In this case, the voltage across the cell is 2 volts with a saving of 1.5 volts over the cell having both electrodes of inert material.

EXAMPLE 18

A cell of the design of FIGURE 2 is constructed of Monel with a screen diaphragm on the anode side of the cation membrane. The anode is constructed of nickel and the cathode is a porous oxygen electrode. The catholyte consists of 1 N potassium hydroxide and is recirculated at 50 ml. per minute. The anolyte is KF·3HF and is recirculated at 50 ml. per minute. The cell is operated at 55° C. with a current density of 70 ma. per square cm. at the anode and an operating voltage of 7.1 volts. 70 percent pure oxygen is fed into the porous cathode at an adequate rate and 98% pure fluorine is generated at the anode. With a Monel cathode as in the conventional fluorine cell, the operating voltage is 8.4 volts compared to the use of 7.1 volts noted above.

EXAMPLE 19

A cell of the design of FIGURE 2 is constructed with a porous oxygen cathode, a graphite anode and a cation membrane separating anode and cathode compartments. A 1.0 N sodium hydroxide solution is circulated in the cathode compartment and an electrolyte containing saturated sodium chloride and 1.3 grams per liter HCl is recirculated in the anode compartment. A current density of 30 milliamps per square cm. is passed to the anode at 2.5 volts. 70 percent pure oxygen is passed into the cathode at an adequate rate. Sodium chlorate is produced in the anode compartment at lower voltages than in the conventional cell, 3.6 v., and at a higher current efficiency due to elimination of the reduction of ClO$^-$ at the cathode due to the presence of the ion exchange membrane in the cell.

I claim:

1. An electrolysis cell comprising: a container, a cathode, and a spaced porous catalytic anode therein, a cation exchange membrane between and separating said electrodes, said membrane being spaced from at least said cathode electrode, means for passing a combustible fuel into said porous catalytic anode electrode, and means for passing a direct electric current between said cathode and anode.

2. The cell of claim 1 wherein the porous catalytic anode is a porous catalytic gas electrode.

3. The cell of claim 1 wherein the container comprises a single liquid electrolyte compartment and said cation exchange membrane is in face-to-face contact with said porous catalytic anode.

4. The cell of claim 1 wherein said ion-exchange membrane is a spaced barrier defining two compartments between said electrodes.

5. A composite electrode comprising a porous catalytic electrode having an ion-exchange membrane secured to and in face-to-face contact with the active surface of only said electrode.

6. The composite electrode of claim 5 wherein said electrode is a porous catalytic anode.

7. A process for electrolytic conversion of electrolyte solutions in an electrolytic cell comprising: a container adapted to contain an electrolyte solution, spaced electrodes therein at least the anode being a porous catalytic electrode, a cation exchange membrane between said electrodes and spaced from the cathode electrode, comprising the steps of: introducing an electrolyte solution into the container, passing a direct electric current between said electrodes, and passing a combustible fuel through said porous anode to lower the energy requirements for conversion of said electrolyte solution by the reaction of said combustible fuel.

8. The method of cathodically depositing a metal from an aqueous electrolyte solution containing a salt of said metal, which comprises introducing said electrolyte into a cell containing a cathode and a spaced anode, the latter consisting of a porous catalytic electrode in face-to-face contact with a cation-exchange membrane, said cation-exchange membrane being in the hydrogen form, passing a combustible gas into said anode, passing a direct current through said electrolyte between the anode and cathode, and collecting deposited metal at said cathode.

9. The method of claim 8 wherein the metal to be deposited is selected from the group consisting of Cu, Cd, Co, Fe, Ni, Cr, Pb, Ag, Sn, and Zn.

10. The method which comprises: passing a mixture of sulfuric acid and ferrous sulfate into the anode compartment of a two compartment cell having electrodes therein separated by a selective cation-exchange membrane defining said compartments into anode and cathode compartments, at least the anode being a porous catalytic electrode, maintaining an electrolyte solution in said cathode compartment, passing a combustible gas into said porous catalytic anode electrode, passing a direct current transversely through said electrodes, membrane and electrolytes, and removing a sulfuric acid bearing solution from the anode compartment.

11. The method of cathodically depositing a metal from an aqueous electrolyte solution containing a salt of said metal, which comprises introducing said electrolyte into a cell containing a cathode and an anode, the latter consisting of a porous catalytic electrode, a cation-exchange membrane between said electrodes and spaced from said cathode, said cation-exchange membrane being in the hydrogen form, passing a combustible gas into said anode, passing a direct electric current through said electrolyte between the anode and cathode, collecting deposited metal at said cathode, and removing the converted electrolyte from the cell.

12. The method of cathodically depositing a metal from an aqueous electrolyte solution containing a salt of said metal, which comprises introducing said electrolyte into a cell containing a cathode and an anode, the latter consisting of a porous catalytic electrode in face-to-face contact with a cation-exchange membrane between said electrodes and spaced from said cathode, said cation-exchange membrane being in the hydrogen form, passing a combustible gas into said anode, passing a direct electric current through said electrolyte between the anode and cathode, collecting deposited metal at said cathode and removing the converted electrolyte from the cell.

References Cited in the file of this patent

UNITED STATES PATENTS

| | | |
|---|---|---|
| 1,182,759 | Emanuel | May 9, 1916 |
| 1,954,664 | Cain | Apr. 10, 1934 |
| 2,273,036 | Heise et al. | Feb. 17, 1942 |
| 2,273,796 | Heise et al. | Feb. 17, 1942 |
| 2,358,419 | Schumacher et al. | Sept. 19, 1944 |
| 2,390,591 | Janes | Dec. 11, 1945 |
| 2,700,063 | Manecke | Jan. 18, 1955 |
| 2,810,686 | Bodamer et al. | Oct. 22, 1957 |

FOREIGN PATENTS

| | | |
|---|---|---|
| 400,787 | France | Aug. 7, 1909 |
| 213,404 | Australia | Feb. 26, 1958 |
| 213,405 | Australia | Feb. 27, 1958 |
| 794,471 | Great Britain | May 7, 1958 |